United States Patent Office 3,847,926
Patented Nov. 12, 1974

---

3,847,926
PROCESS FOR THE PRODUCTION OF DIPHENOXYLATE, ITS DERIVATIVES AND ITS SALTS USING AN AQUEOUS DMF SOLVENT SYSTEM
Humberto Flores Beltran, Mexico, Mexico, assignor to G. D. Searle & Co., Chicago, Ill.
No Drawing. Filed July 20, 1972, Ser. No. 273,416
Int. Cl. C07d 29/32
U.S. Cl. 260—293.75    9 Claims

ABSTRACT OF THE DISCLOSURE

Aqueous dimethylformamide is employed as a solvent system during the condensation of esters of 4-phenylisonipecotic acid with 2,2-diarylhaloalkanonitriles with consequent increase in product yield, shortened reaction time and avoidance of high pressure operation.

---

The present invention is concerned generally with a process for the preparation of esters of N-substituted-phenylisonipecotic acids and, in particular, it is concerned with an improvement in the process for the production of compounds of the following structural formula

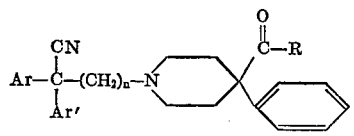

and the salts thereof which are described in U.S. Pat. 2,898,340.

The radical R represents lower alkyl, lower alkyloxy and lower alkenyloxy radicals contining 1 to 6 carbon atoms. Furthermore R represents such cyclo-alkyloxy radicals as cyclopentyloxy and cyclohexyloxy and such aralkyloxy radicals as phenethoxy, phenylpropoxy and the like. The radicals represented by Ar and Ar' are phenyl, tolyl, xylyl and like aryl radicals containing up to 8 carbon atoms and $n$ is an integer greater than 1 and less than 4.

The above-referenced patent describes the condensation of 2,2-diarylhaloalkanonitriles with the appropriate esters of 4-phenylisonipecotic acid in such solvents as aromatic hydrocarbons of 6–9 carbon atoms, lower alkanols and alkanones. Those solvents generally require high pressures and long reaction times for satisfactory completion of the condensation reaction.

The halogen atoms comprehended in the term haloalkanonitriles are illustrated by chlorine, bromine, fluorine and iodine.

It has been discovered that when aqueous dimethylformamide is used as the solvent system in the above condensation reaction numerous unobvious advantages accrue. For example, the reaction time may be decreased; the reaction may be run at atmospheric pressure; and increased yields of product are observed over yields observed with other solvents.

The unobvious advantages of the instant process are demonstrated by the comparison of the solvent system consisting of aqueous dimethylformamide with a solvent system consisting of aqueous n-butanol. The condensation of ethyl 4-phenylisonipecotate and 2,2-diphenyl-4-bromobutyronitrile in n-butanol-water normally requires about a 24 hour reflux time to produce a low and variable yield. Substitution of aqueous dimethylformamide as the solvent system permits the reflux time to be reduced to about 12 hours while obtaining a much higher yield. Those improvements provide substantial economic advantages for the instant process over the process previously used. In addition, the process of the present invention may be run at atmospheric pressure while that employing the n-butanol-water system requires a pressure of about 0.24 kg./cm.

In a preferred embodiment, the present invention is practiced by refluxing a mixture of an appropriate ester of 4-phenylisonipecotic acid and an appropriate 2,2-diaryl-4-halobutyronitrile or 2,2-diaryl-5-halo-valeronitrile in an aqueous dimethylformamide solvent.

In an especially preferred embodiment, the instant process is practiced by refluxing a mixture of a lower alkyl ester of 4-phenylisonipecotic acid and an appropriate 2,2-diphenyl-4-halobutyronitrile or 2,2-diphenyl-5-halovaleronitrile compound in an aqueous dimethylformamide solvent. Generally, a base is added to the solvent to neutralize the hydrogen halide which is liberated during the condensation reaction. However, an excess of the ester of 4-phenylisonipecotic acid may be employed to accomplish the same purpose as the addition of base. Typically, ethyl 4-phenylisonipecotate is refluxed with 2,2-diphenyl-4-bromobutyronitrile in aqueous dimethylformamide to yield diphenoxylate.

The products formed in the above process are recovered by usual extraction methods well known in the art. A convenient extracting solvent is tetrahydrofuranheptane. Ether also has been found to be satisfactory. The products obtained are easily isolable as the hydrochloride salts but can be isolated as pure compound or other salts as well.

The ratio of water to dimethylformamide is not critical. However, a volume ratio of water to dimethylformamide of between about 1:6 and 1:4 is preferred. A volume ratio of water to dimethylformamide of 1 to 5 is particularly preferred. Furthermore, the total quantity of solvent used is not critical, being limited only by standard chemical manufacturing practices. As an example, about 120 liters of total solvent is used for each 10 kilograms of 2,2-diphenyl-4-bromobutyronitrile. The condensation reaction preferably is run under refluxing conditions. Temperatures of between about 85° C. to 120° C. are suitable with a temperature between about 115–118° C. being preferred. Typical bases used to neutralize the hydrogen halide liberated during the condensation are potassium carbonate and sodium carbonate, the latter being preferred.

The compounds produced by the instant process are useful as pharmacological agents. For example, their use in the treatment of diarrhea is described in U.S. Pat. 2,898,340.

The 2,2 - diphenylhaloalkanonitriles are prepared by methods described in Dupre et al., J.C.S., 505 (1949) and the lower alkyl esters of 4-phenylisonipecotic acid are prepared by conventional procedures.

The invention will appear more fully from the examples which follow. Those examples are given by way of illustration only and are not to be construed as limiting the invention either in spirit or in scope as many modifications both in materials and methods will be apparent to those skilled in the art. In the examples which follow temperatures are given in degrees centigrade (° C.) and quantities of materials in parts by weight unless noted otherwise.

EXAMPLE 1

A mixture of 11.3 parts of ethyl 4-phenylisonipecotate, 15.9 parts of 2,2-diphenyl-4-bromobutyronitrile, 6.0 parts of anhydrous sodium carbonate, 7.0 parts of water and 35.0 parts of dimethylformamide is refluxed with vigorous agitation for 12 hours at atmospheric pressure. Then the mixture is cooled to 25° and 42 parts of tetrahydrofuran, 70 parts of water and 32 parts of heptane is added. The aqueous and organic layers are allowed to separate. The organic layer is washed with a saturated sodium chloride solution and then filtered. Then a solution of 16 parts of concentrated hydrochloric acid and 48 parts of water is added to the filtrate. After stirring for 30 minutes, the suspension is filtered at a temperature of about 5°, and the product which collects is washed successively with tetrahydrofuran-heptane and water and then dried at 90° to yield crude diphenoxylate hydrochloride, melting at about 218–221°.

The pure material is obtained by dissolving one part of crude diphenoxylate hydrochloride in 21–22 parts of isopropanol. That solution is refluxed for 5 minutes, cooled to 0° and filtered to collect the product. After washing with cold isopropanol and drying at 65°, pure diphenoxylate hydrochloride melting at about 221.5–223.5° is obtained.

EXAMPLE 2

Substitution of an equivalent quantity of methyl 4-phenylisonipecotate in the procedure of Example 1 affords the hydrochloride salt of the methyl ester of 2,2-diphenyl-4-(4-carboxy - 4 - phenyl-1-piperidino)butyronitrile.

EXAMPLE 3

By substituting an equivalent quantity of 2,2-diphenyl-4-bromovaleronitrile in the procedure of Example 1, there is afforded the hydrochloride salt of the ethyl ester of 2,2-diphenyl-4-(4-carboxy - 4 - phenyl - 1 - piperidino)-valeronitrile.

What is claimed is:

1. In a process for the production of compounds of the following structural formula

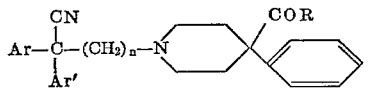

and their pharmaceutically acceptable salts wherein $n$ is 2 or 3, Ar and Ar' are aryl radicals of less than 9 carbon atoms and R is a lower alkyl, lower alkyloxy or a lower alkenyloxy radical containing 1 to 6 carbon atoms or a cyclopentyloxy, cyclohexyloxy or phenylalkyloxy radical, the improvement which comprises condensing a compound of the formula

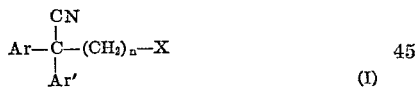

wherein Ar, Ar' and $n$ are as defined above and X is chloro or bromo with a compound of the formula

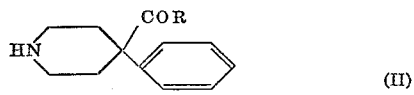

wherein R is as defined above in a solvent system consisting essentially of water and dimethylformamide.

2. As in Claim 1, in a process for the production of compounds of the following formula

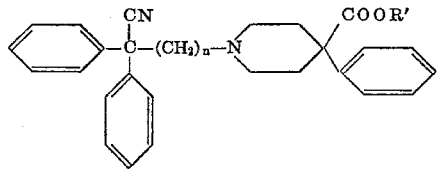

and their pharmaceutically acceptable salts wherein $n$ is 2 or 3 and R' is a lower alkyl radical containing 1 to 6 carbon atoms, the improvement which comprises condensing a compound of formula I wherein Ar and Ar' are phenyl radicals and a compound of formula II wherein R is a lower alkyloxy radical in a solvent system consisting essentially of water and dimethylformamide.

3. The improvement as in Claim 2, wherein the solvent system consists essentially of water, dimethylformamide and a metal carbonate selected from the group consisting of sodium carbonate and potassium carbonate.

4. The improvement as in Claim 3, wherein the solvent system consists essentially of water, dimethylformamide and sodium carbonate.

5. The improvement as in Claim 4, wherein the compound of formula II is ethyl 4-phenylisonipecotate and the compound of formula I is 2,2-diphenyl-4-bromobutyronitrile.

6. The improvement as in Claim 5, wherein the volume ratio of water to dimethylformamide is between about 1:6 and 1:4.

7. The improvement as in Claim 6, wherein the volume ratio of water to dimethylformamide is about 1 to 5.

8. The improvement as in Claim 7, wherein ethyl 4-phenylisonipecotate and 2,2-diphenyl - 4 - bromobutyronitrile are condensed at a temperature between about 85–120 degrees Centigrade.

9. The improvement as in Claim 8, wherein the temperature is between about 115–118 degrees Centigrade.

References Cited

UNITED STATES PATENTS 2,898,340   8/1959   Janssen _____ 260—293.75
3,539,579   11/1970  Janssen _____ 260—293.75

OTHER REFERENCES

Advances in Organic Chemistry, vol. 5: 2, 3, 22, 23 (1965), "The Use of Dipolar Aprotic Solvents in Organic Chemistry"—Parker.

Advances in Organic Chemistry 5: 24 (1965). Parker, "The Use of Dipolar Aprotic Solvents in Organic Chemistry."

JACS, 76: 1944–1945 (1954), Billman et al.

NORMA S. MILESTONE, Primary Examiner

S. D. WINTERS, Assistant Examiner